US012246860B2

(12) United States Patent
Nikitenko

(10) Patent No.: US 12,246,860 B2
(45) Date of Patent: Mar. 11, 2025

(54) REMOTE DROP ZONE ATMOSPHERICS AND MARKING PLATFORM

(71) Applicant: Patrick Lee Nikitenko, Tucson, AZ (US)

(72) Inventor: Patrick Lee Nikitenko, Tucson, AZ (US)

(*) Notice: Subject to any disclaimer, the term of this patent is extended or adjusted under 35 U.S.C. 154(b) by 204 days.

(21) Appl. No.: 17/716,138

(22) Filed: Apr. 8, 2022

(65) Prior Publication Data

US 2022/0324566 A1 Oct. 13, 2022

Related U.S. Application Data

(60) Provisional application No. 63/172,328, filed on Apr. 8, 2021.

(51) Int. Cl.
*B64U 10/14* (2023.01)
*B64U 101/05* (2023.01)
*G05D 1/00* (2024.01)

(52) U.S. Cl.
CPC ........... *B64U 10/14* (2023.01); *G05D 1/0016* (2013.01); *G05D 1/0022* (2013.01); *B64U 2101/05* (2023.01); *B64U 2201/10* (2023.01)

(58) Field of Classification Search
CPC .................................................. B64U 2201/10
See application file for complete search history.

(56) References Cited

U.S. PATENT DOCUMENTS

| | | | | |
|---|---|---|---|---|
| 5,186,418 A * | 2/1993 | Lauritsen | ................. | B64D 1/00 244/152 |
| 8,437,891 B2 * | 5/2013 | Yakimenko | ........... | B64D 17/025 701/4 |
| 10,395,544 B1 * | 8/2019 | Harris | ..................... | B64F 1/007 |
| 2009/0326792 A1 * | 12/2009 | McGrath | ................. | G01W 1/08 701/4 |
| 2014/0043172 A1 * | 2/2014 | Manobianco | ........... | G01W 1/08 340/870.07 |
| 2014/0224009 A1 * | 8/2014 | Brown | ................. | G01P 13/045 73/170.28 |
| 2017/0372256 A1 * | 12/2017 | Kantor | ................... | H04W 4/027 |
| 2019/0154874 A1 * | 5/2019 | Shams | ................... | B64U 50/13 |
| 2019/0210735 A1 * | 7/2019 | Shih | ....................... | B64U 70/83 |
| 2020/0025972 A1 * | 1/2020 | MacArthur | ............. | B64C 31/00 |
| 2020/0164979 A1 * | 5/2020 | Sokolowski | ........... | B64C 39/024 |
| 2023/0264814 A1 * | 8/2023 | Wu | ....................... | B64C 39/024 701/2 |
| 2023/0308042 A1 * | 9/2023 | Boyk | ........................ | F42B 3/02 |

FOREIGN PATENT DOCUMENTS

| | | | | | |
|---|---|---|---|---|---|
| CA | 3030917 A1 | * | 7/2020 | | |
| DE | 102014105001 A1 | * | 10/2015 | ........... | G08G 5/0013 |
| DE | 102016110477 A1 | * | 12/2017 | ............. | G05D 1/102 |
| RU | 2681241 C1 | * | 3/2019 | | |
| TW | 202333995 A | * | 9/2023 | ........... | B64C 39/024 |
| TW | I816240 B | * | 9/2023 | | |
| WO | WO-2016097375 A1 | * | 2/2016 | ........... | B64C 39/026 |

\* cited by examiner

*Primary Examiner* — Christopher P Ellis
(74) *Attorney, Agent, or Firm* — Martin S. High, P.C.

(57) ABSTRACT

A Remote Drop Zone Atmospherics and Marking Platform provides wind speed and direction information to parachutists or operators who are using parachutes to deliver a parachutist or autonomous load to the ground.

18 Claims, 3 Drawing Sheets

REMOTE DROP ZONE ATMOSPHERICS AND MARKING PLATFORM

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the Remote Drop Zone Atmospherics and Marking Platform is wind direction and velocity sensing. More specifically general field of the embodiments of the Remote Drop Zone Atmospherics and Marking Platform is aid to parachutists and parachuting.

SUMMARY OF THE EMBODIMENTS

The objective of the embodiments of the Remote Drop Zone Atmospherics and Marking Platform is to provide wind speed and direction information to parachutists or operators who are using parachutes to deliver Parachutists and unmanned autonomous load to the ground.

There has thus been outlined, broadly, the more important features of the embodiments in order that the detailed description thereof that follows may be better understood, and in order that the present contribution to the art may be better appreciated. There are, of course, additional features of the embodiments that is described hereinafter and which will form the subject matter of the claims appended hereto. In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for description and should not be regarded as limiting. As such, those skilled in the art will appreciate that the conception, upon which this disclosure is based, may readily be used as a basis for the designing of other structures, methods, and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1:
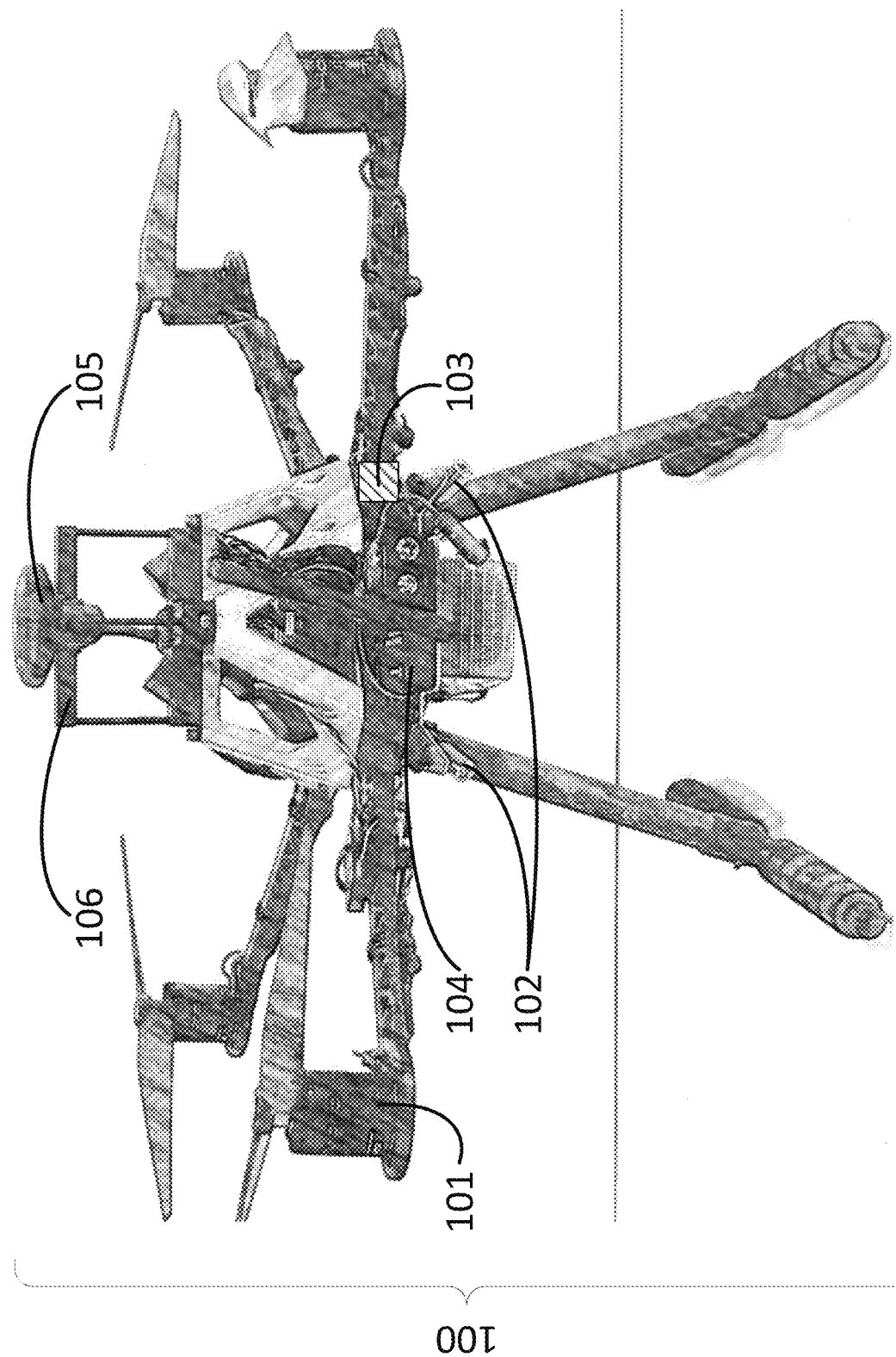
FIG. 1 is a front view of an embodiment of the Remote Drop Zone Atmospherics and Marking Platform.
Figure 2:
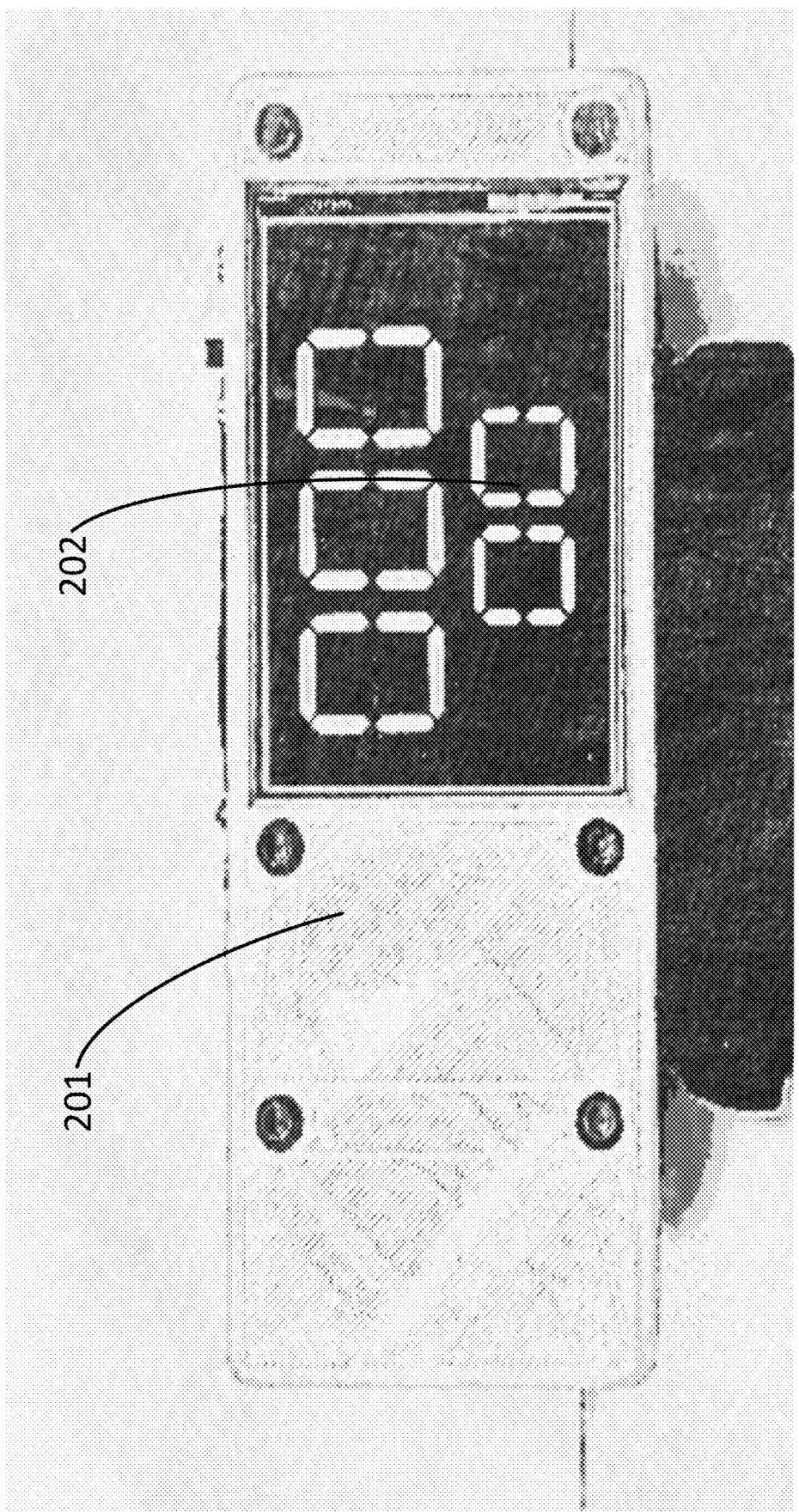
FIG. 2 is a front view of an embodiment of the of the radio receiver unit of the Remote Drop Zone Atmospherics and Marking Platform.
Figure 3:
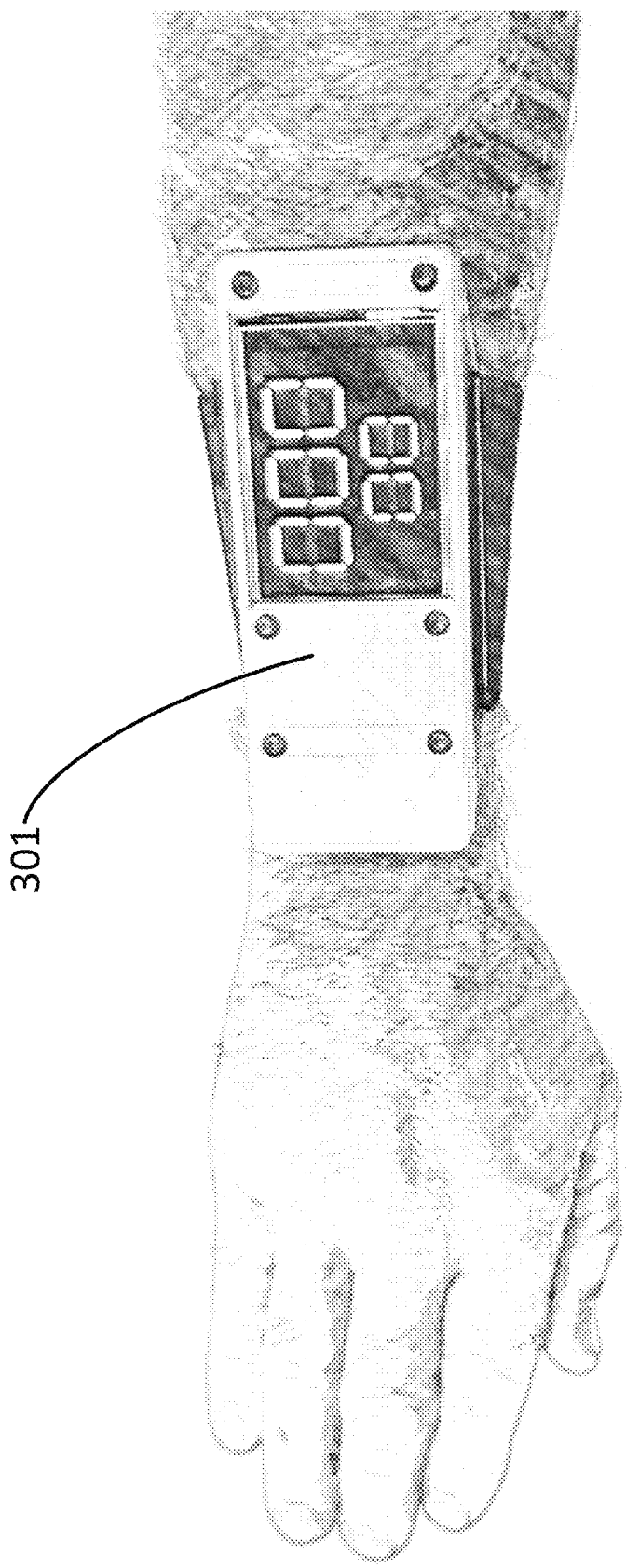
FIG. 3 is a front view of an embodiment of the of the parachutist wrist display of the Remote Drop Zone Atmospherics and Marking Platform.

Embodiments of the Remote Drop Zone Atmospherics and Marking Platform (hereinafter "Platform") 100 comprise an unmanned aerial vehicle ("UAV") 101, IR lasers 102, a programmable microprocessor 103, sensors 104, an anemometer 105, a GPS receiver 106, and either a remote display 201 or a wrist display 301 or both a remote display 201 and a wrist display 301. The UAV 101 can be any remotely operated unmanned aerial vehicle including, without limitation, a quad copter, and drones in all sizes.

The programmable microprocessor 103 controls the UAV in all aspects. The programmable microprocessor 103 comprises wireless or wired communication with the remote display, wrist display or cellphone app for programming. In addition, the programmable microprocessor 103 comprises remote wireless communication to the remote display or wrist display, the jumper's phone application, or an Autonomous Guidance Unit ("AGU") 301 to receive updated instructions from the remote display wrist display or phone app 301 while the UAV is in flight. The AGU comprises guidance, navigation and control software package required to operate the steering lines of a parachute autonomous payload. The programmable microprocessor 103 comprises flight controls for the UAV so that the programmable microprocessor 103 controls basic flight controls. These flight controls comprise correcting the orientation, direction of flight, and speed of flight from the moment the UAV is released. By way of example, the programmable microprocessor 103 can correct orientation of the UAV if the UAV is launched in an inverted orientation or any other abnormal flight orientation. The programmable microprocessor 103 comprises flight control instructions to navigate the UAV to the designated landing location and displaying requested ground marking reference markers from the IR lasers 102.

The remote display 201 comprises any method of display of position and wind velocity 202 including a mobile phone app.

In an embodiment of the Platform 100, the UAV 101 is worn on the front of the jumper when they leave the aircraft. The UAV 101 containment sling is clipped into the parachute harness during aircraft exit. The programmable microprocessor 103 is preloaded with latitude and longitude for the landing area. At a specified altitude, the jumper pulls the UAV 101 from the containment sling and drops it clear of himself. The sensors 104 indicate to the microprocessor 103 that the UAV 101 is in freefall and gains stability and flies to the preset or updated latitude and longitude landing location. While in route to the present landing location, the sensors 104, 105, 106 updates the wind information at every 1000 ft and relays that information to the jumper via the wrist display, remote display or phone app 301. This information is displayed on the jumper's wrist display 301 or remote display 201 or phone app on a jumper or received by an AGU. This information allows the jumper or the AGU to recalculate its course to optimize the winds.

Once the UAV sensor arrives at the landing area it hovers above the ground and sends the wind direction and velocity to the jumper or AGU. Once close enough to the landing location, the jumper may request the UAV sensor mark the landing area with IR lasers or other marking device 102 forming a ground marking reference. Most importantly, the IR lasers 102 form a directional indication showing the landing direction into the wind so the jumper can land safely into the wind.

In other embodiments of the Platform, the UAV can be dropped from the plane, or it can be carried out by a jumper. The required battery life and weight dictate how the Remote Drop Zone Atmospherics and Marking Platform is deployed. The UAV can be released miles away from the actual drop zone and can fly to drop zone faster than the parachutist or autonomous load. In addition, the UAV can be sent to another drop zone location from the jumper should they decide to pick a new location in the air. The wrist display 301 comprises multiple push buttons on it which would send a preloaded latitude and longitude to the UAV 101, which this could also be accomplished by the remote display 201 or phone app. The data sent by the UAV is received by the jumper's wrist display 301 or a remote display 201, or cellular phone app and makes real time automatic corrections to the navigation plan. The cellular phone will have a drone app in the navigation program.

In another embodiment, before the jumper gets to the drop zone, the jumper can direct the microprocess 103 to pan the IR lasers 102 upwards so the jumper can see the location of the drop zone. As an example, the drop zone could be a 50 yard wide clearing in a forest, which would be difficult to see without the aid of the UAV. The IR lasers 102 marking would assure the jumper they are on target to the drop zone. The jumper could then direct the IR lasers 102 back on the ground to mark the landing direction.

In another embodiment, the Platform could direct the IR lasers 102 on the UAV to draw or present the wind velocity in numeric digits or dots on the ground. The below graph is a representation of the drone marking the landing direction and velocity with the IR lasers 102. It could give velocity or not which would be the jumpers choice. The velocity could be represented in single dot on the ground for windspeed of 0-5 kts, two dots for windspeed of 6-10 kts, three dots for windspeed of 11-15 kts, or four dots for windspeed of 16-20 kts.

Once the jumper lands the platform can be repurposed for surveillance or a communication repeater or whatever the user desires. The UAV can be recharged or allow for a change in battery. The UAV 101 can allow for a sensor package change.

The Platform can also provide real time wind conditions (direction and velocity) for third party applications through via the remote display, wrist display or the jumper's phone application direct. The UAV 101 can send the updated wind direction and velocity via a wireless signal (e.g., WIFI, Bluetooth, or other radio frequency communications) directly to the jumper's phone app or autonomous load AGU. Multiple jumpers on the same network would receive wind data updates in real time. In addition, the wind data can be received by wireless communication receivers in the wrist or remote display and then transmitted to the phone application via wireless communication.

Given that the UAV 101 is relaying real time information to the remote display or wrist display, or the jumper's phone application, the jumper has a significantly increased chance of hitting the jumper's intended target. Give the wind velocity information, the jumper will be informed as to the conditions of the wind between the jumper's current location and that of the UAV 101. With the information the jumper informed of his glide ratio, glide to destination via the remote display or wrist display, the jumper's phone application or via a head up display worn by the jumper. In addition, the jumper will be informed via a sliding bar that displays red, yellow, or green bars for information on whether the jumper will miss the target, is in danger of missing the target, or will make the target, respectively, given the wind conditions monitored by the UAV 101. If the wind conditions transmitted by the UAV 101 indicate that the jumper will not make the target, the jumper is given alternative target locations from which to choose.

In another embodiment, the IR lasers 102 are replaced with any type of landing zone marking means including lighting or radiation of any other wavelength or wavelengths, audible marking means.

What I claimed is:

1. A remote drop zone atmospherics and marking platform comprising
    a) an unmanned aerial vehicle capable of hovering,
    b) IR lasers that display ground marking reference markers including directional indication showing the landing direction into the wind,
    c) a programmable microprocessor,
    d) sensors,
    e) an anemometer,
    f) an optional autonomous guidance unit,
    g) a GPS receiver, and either a remote display or a wrist display or both a remote display and a wrist display.

2. The remote drop zone atmospherics and marking platform described in claim 1 comprising a quad copter or a drone.

3. The remote drop zone atmospherics and marking platform described in claim 1 comprising the programmable microprocessor controlling the unmanned aerial vehicle.

4. The remote drop zone atmospherics and marking platform described in claim 1 comprising wireless or wired communication with the remote display, wrist display, and cellphone application.

5. The remote drop zone atmospherics and marking platform described in claim 1 comprising remote wireless communication to one or more selected from the group consisting of the remote display, the wrist display, the jumper's phone application, and an autonomous guidance unit.

6. The remote drop zone atmospherics and marking platform described in claim 5 comprising the autonomous guidance unit comprising guidance, navigation and control software package required to operate the steering lines of a parachute autonomous payload.

7. The remote drop zone atmospherics and marking platform described in claim 1 comprising the programmable microprocessor comprising flight controls for the unmanned aerial vehicle so that the programmable microprocessor controls basic flight controls of the unmanned aerial vehicle.

8. The remote drop zone atmospherics and marking platform described in claim 7 comprising the flight controls comprising correcting one or more of the orientation, direction of flight, and speed of flight from the moment the unmanned aerial vehicle is released.

9. The remote drop zone atmospherics and marking platform described in claim 8 comprising the flight controls of correcting the orientation of the unmanned aerial vehicle if the unmanned aerial vehicle is launched in an inverted orientation or any other abnormal flight orientation.

10. The remote drop zone atmospherics and marking platform described in claim 9 comprising the flight controls of navigating the unmanned aerial vehicle to the designated landing location.

11. The remote drop zone atmospherics and marking platform described in claim 2 comprising the programmable microprocessor controlling the unmanned aerial vehicle.

12. The remote drop zone atmospherics and marking platform described in claim 11 comprising wireless or wired communication with the remote display, wrist display, and cellphone application.

13. The remote drop zone atmospherics and marking platform described in claim 12 comprising remote wireless communication to one or more selected from the group consisting of the remote display, the wrist display, the jumper's phone application, and an autonomous guidance unit.

14. The remote drop zone atmospherics and marking platform described in claim 13 comprising the autonomous guidance unit comprising guidance, navigation and control software package required to operate the steering lines of a parachute autonomous payload.

15. The remote drop zone atmospherics and marking platform described in claim 14 comprising the programmable microprocessor comprising flight controls for the unmanned aerial vehicle so that the programmable microprocessor controls basic flight controls of the unmanned aerial vehicle.

16. The remote drop zone atmospherics and marking platform described in claim 15 comprising the flight controls comprising correcting one or more of the orientation, direction of flight, and speed of flight from the moment the unmanned aerial vehicle is released.

17. The remote drop zone atmospherics and marking platform described in claim 16 comprising the flight controls of correcting the orientation of the unmanned aerial vehicle if the unmanned aerial vehicle is launched in an inverted orientation or any other abnormal flight orientation.

18. The remote drop zone atmospherics and marking platform described in claim 17 comprising the flight controls of navigating the unmanned aerial vehicle to the designated landing location.

* * * * *